(12) United States Patent  
Kikuchi

(10) Patent No.: US 7,048,415 B2  
(45) Date of Patent: May 23, 2006

(54) HOUSING FORMING METHOD AND HOUSING STRUCTURE

(75) Inventor: Tadashi Kikuchi, Kanagawa (JP)

(73) Assignees: Mitsubishi Fuso Truck & Bus Corporation, Tokyo (JP); Mitsubishi Jidosha Engineering Kabushiki Kaisha, Kanagawa (JP)

( * ) Notice: Subject to any disclaimer, the term of this patent is extended or adjusted under 35 U.S.C. 154(b) by 184 days.

(21) Appl. No.: 10/491,172

(22) PCT Filed: Jul. 7, 2003

(86) PCT No.: PCT/JP03/08587

§ 371 (c)(1),  
(2), (4) Date: Mar. 30, 2004

(87) PCT Pub. No.: WO2004/005004

PCT Pub. Date: Jan. 15, 2004

(65) Prior Publication Data

US 2004/0244331 A1 Dec. 9, 2004

(30) Foreign Application Priority Data

Jul. 8, 2002 (JP) .............................. 2002-198278

(51) Int. Cl.  
*F21V 3/00* (2006.01)

(52) U.S. Cl. .................. 362/311; 362/546; 362/507

(58) Field of Classification Search ................ 362/507, 362/509, 310, 311, 267, 546  
See application file for complete search history.

(56) References Cited

U.S. PATENT DOCUMENTS

| 6,270,242 B1 * | 8/2001 | Suzuki et al. ................ 362/546 |
| 6,523,983 B1 * | 2/2003 | Young, Jr. .................. 362/546 |
| 6,619,830 B1 * | 9/2003 | Nagakura et al. ........... 362/546 |
| 6,811,285 B1 * | 11/2004 | Ferguson et al. ........... 362/267 |

* cited by examiner

*Primary Examiner*—Ali Alavi  
(74) *Attorney, Agent, or Firm*—Birch Stewart Kolasch & Birch LLP

(57) ABSTRACT

An object of the invention is to provide a method for easily molding projections on an end edge along an opening in a housing which project towards an opposite side of the end edge to the opening, and to provide a housing structure related to the method.

The invention relates to a method for molding a housing, including molding an end edge (6) which extends outwardly of an opening (4) in a housing (1) such that a closing member (5) for closing the opening (4) is locked thereto by using a first mold (30) having a grating-like portion and a second mold (40) adapted to alternately mesh with the grating-like portion of the first mold (30), and forming an projection (28) which projects towards an opposite side to the opening (4) on an outer side of the end edge (6) by drawing out the grating-like portion of the first mold (30) which penetrates the end edge (6) towards the opening (4) side which is opposite to an end portion of the grating-like portion and drawing out the second mold (40) from the end edge (6) position outwardly of the housing (1).

8 Claims, 5 Drawing Sheets

HOUSING FORMING METHOD AND HOUSING STRUCTURE

TECHNICAL FIELD

The present invention relates to a method for molding a housing and a housing structure, and more particularly to a method for molding a lamp housing used for a headlamp, etc., and a lamp housing structure.

BACKGROUND ART

In an example of a conventional headlamp of a vehicle, as shown in FIGS. 9 and 10, a bulb 2 and a reflector 3 are disposed in the interior of a lamp housing 1 made of a resin, and a lamp lens 5 is assembled over an opening 4 formed in the lamp housing 1 on a side thereof which faces the front of the vehicle. A packing 8 is interposed between an end edge 6 of the lamp housing 1 by which the opening 4 is defined and an end edge 7 of the lamp lens 5, and the lamp housing 1 and the lamp lens 5 are locked together by clips 9 which are each formed of a steel spring plate and which are disposed along an outer circumferential direction of the housing and lens at appropriate intervals.

In order to ensure the locking by the clips 9, the followings are needed.

Firstly, a projection 10 which projects towards the rear in a longitudinal direction of the vehicle is formed on the end edge 6 of the lamp housing 1, and a projection 11 which projects towards the front in the longitudinal direction of the vehicle is formed on the end edge 7 of the lamp lens 5. A clip 9 is then brought into engagement with these projections 10, 11. In this way, the locking by the clip 9 can be ensured.

Incidentally, when molding the lamp housing 1, in order to form a recessed portion in which the packing 8 is disposed in the end edge 6 on a side thereof which faces the front of the vehicle, a mold 12 indicated by a two-dot chain line needs to be drawn towards the front side of the vehicle (leftwards in FIG. 10) as indicated by an arrow A. On the other hand, in order to form the projection 10 on the end edge 6 on a side thereof which faces the rear of the vehicle, a mold 13 indicated by the two-dot chain line needs to be drawn towards the rear side of the vehicle (rightwards in FIG. 10) as indicated by an arrow B.

There may be a case in which a mounting seat surface of the lamp housing 1 or a reinforcement rib 14 (hereinafter, simply referred to as a rib 14) is provided on an outer circumferential wall surface of the lamp housing 1 in the vicinity of an end of the projection 10 on the end edge 6 which faces the rear of the vehicle. As this occurs, while the projection 10 and the rib 14 are desired to be molded at the same time, since the rib 14 is situated on the drawing path of the mold 13 (in the direction indicated by the arrow B), the mold 13 cannot be drawn as desired, and therefore, it is extremely difficult in reality to form the projection 10 and the rib 14 at the same time. Thus, the degree of freedom in designing the lamp housing 1 is largely limited. Also, the number of molds is increased due to the provision of the rib 14, this leading to a problem that the production costs are increased.

An object of the invention is to provide a method for easily molding a projection on an end edge defining an opening in a housing, which projects towards an opposite side of the end edge to the opening, and to provide a housing structure related to the method.

DISCLOSURE OF THE INVENTION

To this end, in a method for molding a housing according to the invention, an end edge (6) which extends outwardly of an opening (4) in a housing (1) such that a closing member (5) for closing the opening (4) is locked thereto is molded by using a first mold (30) having a grating-like portion and a second mold (40) adapted to alternately mesh with the grating-like portion of the first mold (30), and an projection (28) which projects towards an opposite side to the opening (4) is formed on an outer side of the end edge (6) by drawing out the grating-like portion of the first mold (30) which penetrates the end edge (6) towards the opening (4) side which is opposite to an end portion of the grating-like portion and drawing out the second mold (40) from the end edge (6) position outwardly of the housing (1).

Consequently, according to the method for molding a housing according to the invention, the second mold for molding the projection is drawn out from the end edge position of the housing outwardly of the housing. Namely, since a drawing to the opposite side to the opening is not needed, in addition to the formation of the projection, an extending member such as a rib can easily be provided on the outer circumferential wall surface of the housing close to the projection on the opposite side to the opening.

In addition, in a structure according to the invention for a housing (1) in which a closing member (5) is engaged by an engagement member (9), the structure has an opening (4) closed by the closing member (5), an end edge (6) extending from the opening (4) outwardly of the housing (1) and a locking portion (20) formed on the end edge (6), the locking portion (20) is provided with a plurality of through holes (22) which pass through the locking portion (20) from a side thereof which face the opening to an opposite side thereof to the opening, a plurality of vertical walls (23) which divide the adjacent through holes and a lateral wall connecting the vertical walls (23) at one ends thereof, the vertical walls (23) are formed shorter than the lateral wall (24) on the opposite side thereof to the opening, and the lateral wall (24) has notches (27) formed therein on the opposite side to the opening and at locations which confront the vertical walls (23) and projections (28) formed thereon on the opposite side to the opening and at locations which confront the through holes (22), respectively.

Consequently, according to the housing structure, since the projections (28) are formed on the end edge (6) which project to the opposite side of the end edge (6) to the opening, the closing member (5) can securely locked to the end edge (6) of the housing by bringing the engagement members (9) into engagement with the projections (28).

MODE FOR CARRYING OUT THE INVENTION

Figure 1:
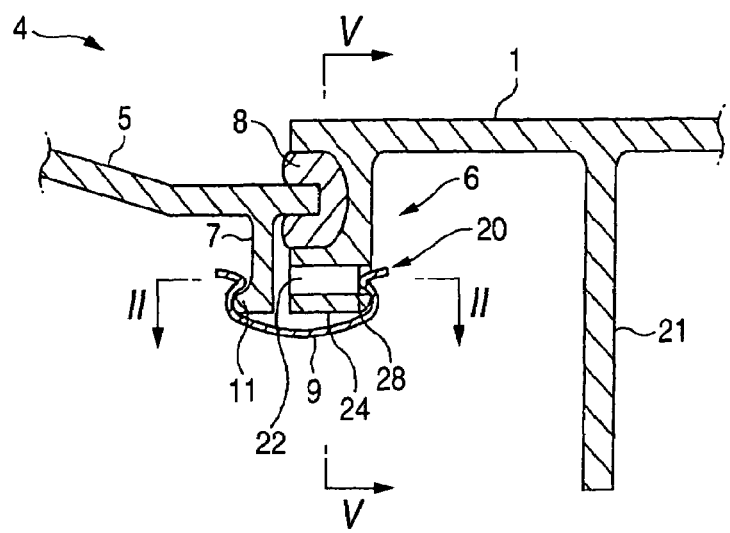
FIG. 1 is a vertical cross-sectional view of a main part of a lamp housing adopting an embodiment of the invention (corresponding to a portion indicated by X in FIG. 9)
Figure 2:
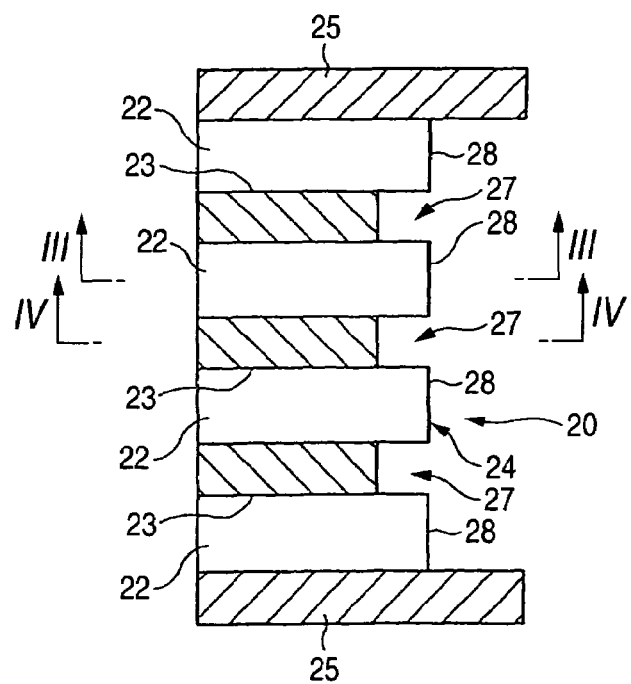
FIG. 2 is an enlarged development as seen in a direction indicated by arrows II—II in FIG. 1.
Figure 3:
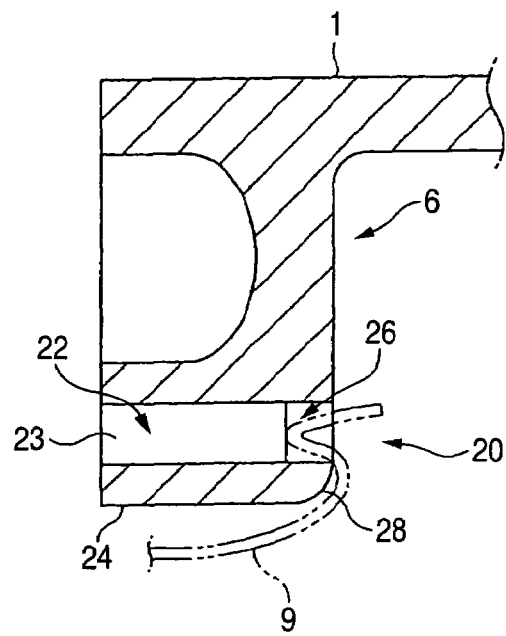
FIG. 3 is an enlarged vertical cross-sectional view as seen in a direction indicated by arrows III—III in FIG. 2.
Figure 4:
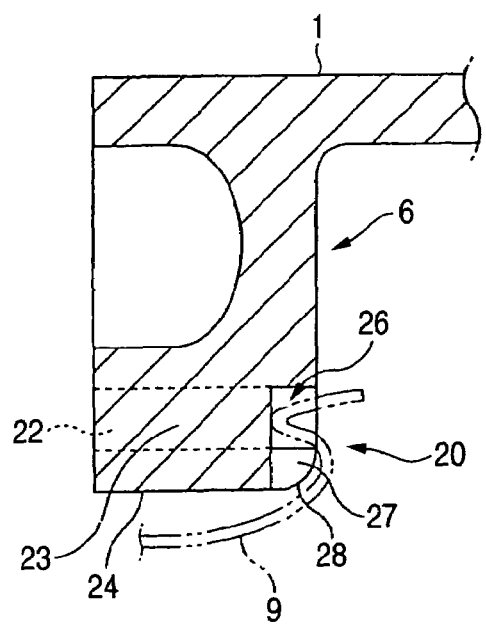
FIG. 4 is an enlarged vertical cross-sectional view as seen in a direction indicated by arrows IV—IV in FIG. 2.
Figure 5:
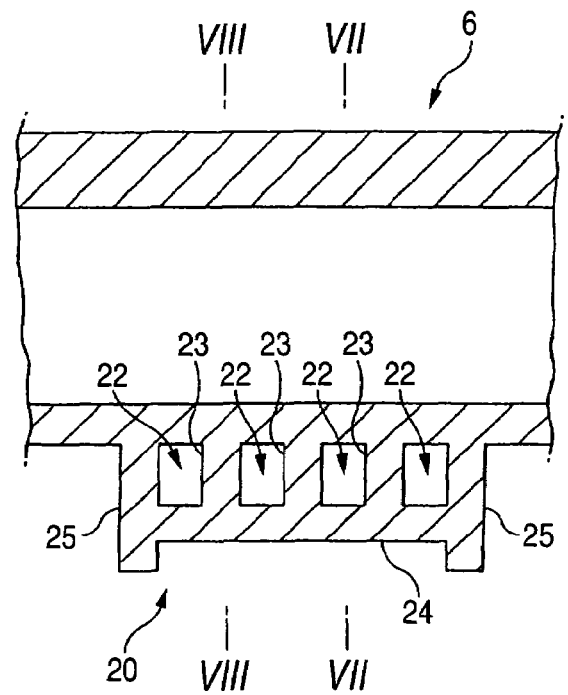
FIG. 5 is an enlarged vertical cross-sectional view taken along the line V—V in FIG. 1.
Figure 6:
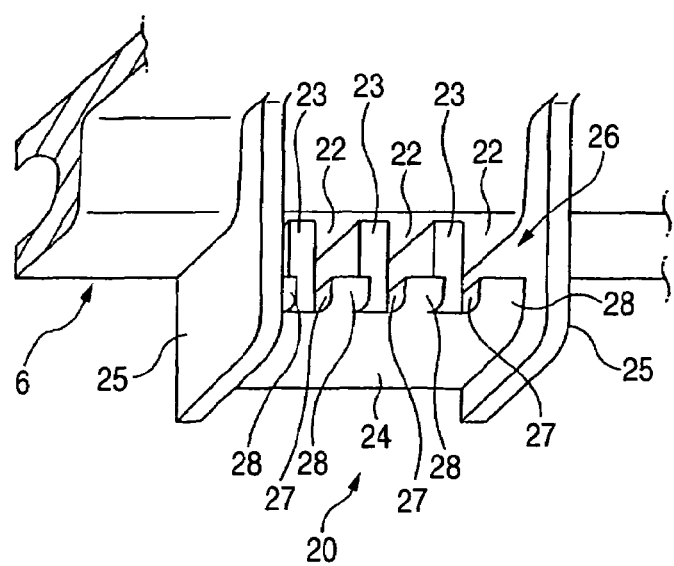
FIG. 6 is an enlarged perspective view of the main part of the lamp housing.

An embodiment of the invention will be described below with like reference numerals being given to like portions to those of the conventional housing example that has been described above.

Firstly, a lamp housing 1 constituting a housing will be briefly described according to FIG. 1.

In the lamp housing 1 made of a resin for an automotive headlamp, locking portions 20 each having an appropriate width are formed in a circumferential direction on an outer side of an end edge 6 of an opening 4 formed in the lamp housing 1 on a side thereof which faces the front of a vehicle. The locking portions 20 are provided along the outer circumference of the lamp housing 1 with an appropriate interval being provided therebetween. A lamp housing mounting rib (an extending member) 21 is formed on a lower surface of the lamp housing 1 close to a side of the locking portion 20 facing the rear of the vehicle (the right-hand side in FIG. 1) which is an opposite side of the locking portion 20 to the opening.

Next, the locking portion 20 will be described based on FIGS. 2 to 6.

Each locking portion 20 has on an outer side of the end edge 6 four square holes 22 constituting a plurality of through holes passing therethrough from the opening side of the locking portion 20 to the other side. By this, the locking portion 20 has vertical wall portions 23 constituting a plurality of vertical walls that divide the respective square holes 22 provided in parallel, a lateral wall portion 24 constituting a lateral wall that connects lower ends of the respective vertical wall portions 23, and side wall portions 25 connecting both side edges of the lateral wall portion 24 and an outer circumferential surface of the lamp housing 1.

The vertical wall portion 23 is set shorter than the lateral wall portion 24 on the opposite side thereof to the opening, and a substantially rectangular parallelepiped space 26 is defined on the side of each vertical wall portion 23 which is opposite to the opening (on the side thereof which faces the rear of the vehicle). In addition, a notch 27 is provided at a position below the space 26 and corresponding to the vertical wall portion 23, whereby a plurality of projections 28 which project towards the opposite side to the opening are formed discontinuously at lower positions on the opposite side to the opening so as to correspond to the square holes 22, respectively.

Thus, in the housing structure according to the embodiment of the invention, clips 9 which constitute engagement members are brought into engagement with projections 11 formed on an end edge 7 of a lamp lens 5 which constitutes a closing member and the projections 28 formed on the locking portions 20 provided on the outer surface of the end edge 6 of the lamp housing 1 in such a manner as to straddle therebetween, whereby the end edge 7 of the lamp lens 5 can be securely and easily locked to the end edge 6 of the lamp housing 1 with a packing 8 being held terebetween.

Next, a method for molding the locking portions 20 on the end edge 6 will be described according to FIGS. 7 and 8.

A mold 30 which constitutes a first mold has a central portion 31 for molding an internal surface of the lamp housing 1, an end face portion 32 for molding an opening-side end face of the end edge 6 of the lamp housing 1, a plurality of square pillar portions 33 which project from the end face portion 32 and which constitute pillar-like portions which correspond to a molded shape of the square holes 22, void portions 34 corresponding to a molded shape of the respective vertical wall portions 23, and a mold registering surface 35.

The square pillar portions 33 and the void portions 34 are disposed in parallel alternately, and the foursquare pillar portions 33 constitute a grating-like portion which looks like teeth of a comb.

A mold 40 which constitutes a second mold has square pillar portions 41 which correspond to molded shapes of the spaces 26 rearward of the vertical wall portions 23 and the notches 27 in the lateral wall portion 24, an end face 42 for molding an outer circumferential surface of the lamp housing 1 which is situated on a side thereof which faces the front of the vehicle, an end face 43 for molding a surface of the mounting rib 21 which faces the front of the vehicle and a lower surface thereof, and mold fitting surfaces 44, 45.

A mold 50 has an end face 51 for molding an outer surface of the lamp housing 1 on the rear side of the vehicle, an end face 52 for molding a side surface of the mounting rib 21 which faces the rear of the vehicle and a mold fitting surface 53.

Figure 7:
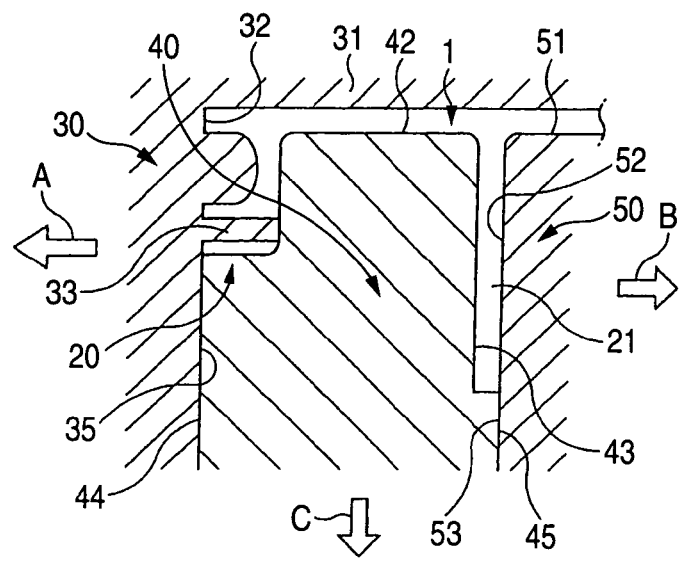
FIG. 7 is an explanatory view of the embodiment taken along the line VII—VII in FIG. 5 (illustrating a mated state of molds)
Figure 8:
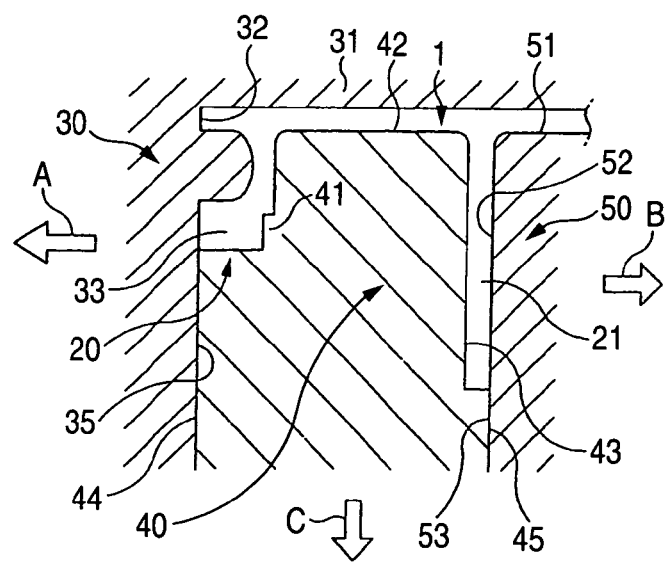
FIG. 8 is an explanatory view of the embodiment taken along the line VIII—VIII in FIG. 5 (illustrating a mated state of the molds)
Figure 9:
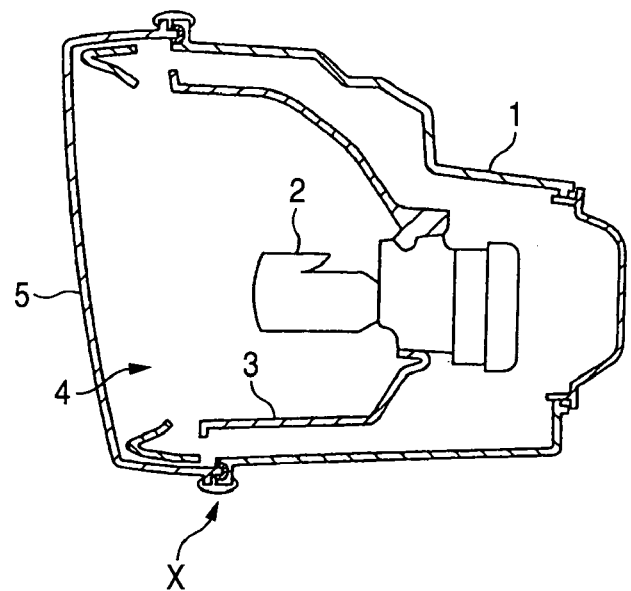
FIG. 9 is a schematic vertical cross-sectional view of a conventional lamp housing 9.
Figure 10:
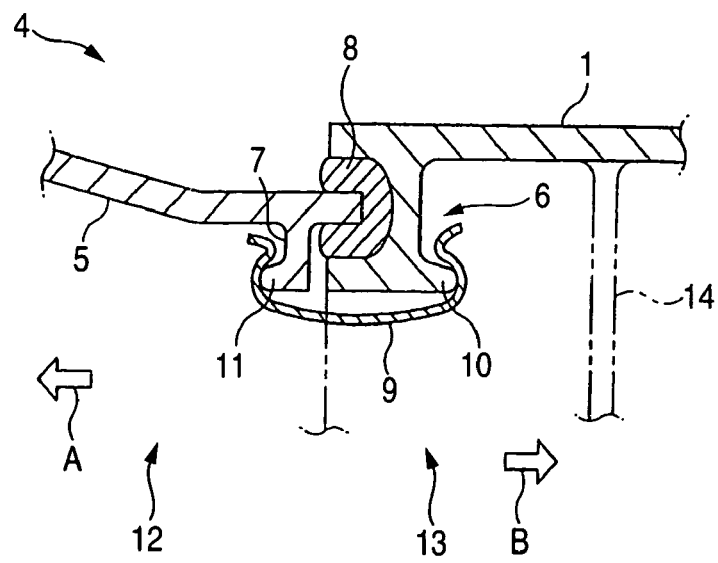
FIG. 10 is an enlarged view of an X portion in FIG. 9.

In molding the lamp housing 1, while these molds 30, 40, 50 are assembled and fastened together as shown in FIGS. 7 and 8, as this occurs, the square pillar portions 41 of the mold 40 are made to alternately mesh with end portions of the square pillar portions 33 of the folding mold 30. In other words, the mold 30 and the mold 40 are assembled together in such a manner that the square pillar portions 41 which constitute elongated protruding portions protrude into the void portions 34 formed between the adjacent square pillar portions 33.

In the event that a lamp housing 1 is formed from this state, the main portions of the locking portion 20 are molded as follows. Namely, square holes 22 are formed by the square pillar portions 33. Vertical wall portions 23 are molded by the void portions 30 and the square pillar portions 41. A lateral wall portion 24, projections 28 and notches 27 are formed by the square pillar portions 33, the void portions 34 and the square pillar portions 41.

In addition, the respective molds are removed from each other as follows. Namely, the mold 30 which has the square pillar portions 33 passing through the locking portion 20 from the opening side to the other side on the outer surface of the end edge 6 is drawn to the opening side which is opposite to the end portions of the square pillar portions 33 (in a direction indicated by an arrow A, the mold 50 is drawn to the side which is opposite to the opening (in a direction indicated by an arrow B), and the mold 40 is drawn from the position where the end edge 6 is formed to a direction towards an external side of the lamp housing 1 (in a downward direction in the drawing) which intersects with a direction indicated by an arrow A at right angles, as indicated by an arrow C. Here, as shown in FIG. 8, since the square pillar portions 41 of the mold 40 are provided in such a manner as to extend directly downwardly from the void portions in the mold 30 to a location which constitutes the lateral wall portion 24 of the locking portion 20 in the lamp housing 1, even if the projections 28 are molded, the mold 40 can be drawn downwardly without being disrupted by the projections 28.

By this, the locking portion 20 having the plurality of projections 28 which protrude to the opposite side to the opening can easily be molded on the end edge 6. In addition, since there is caused no specific problem with molding the mounting rib 21 which extends outwardly of the lamp housing 1, the mounting rib 21 can be molded at the same time that the locking portion 20 is molded.

Namely, as has been described heretofore, according to the method for molding a housing according to the embodiment of the invention, even if the projections 28 are molded on the locking portion 20 which protrude to the side thereof which is opposite to the opening, since the mold 40 for molding the projections 28 is drawn in the downward direction which intersects with the mold 30 at right angles, in other words, there is no case where the mold 40 is drawn to the side which is opposite to the opening, an extending member such as the mounting rib 20 can formed in such a manner as to be close to the side of the locking portion 20 which faces the rear of the vehicle easily and simultaneously.

Consequently, the degree of freedom in laying out the headlamp can be increased at the same time that the degree of freedom in designing the lamp housing 1 can be increased. In addition, the increase in the number of molds can be suppressed, whereby the production costs of the lamp housing 1 can simply be decreased. Moreover, the clips 9 which have been in use conventionally can be used as they are, and therefore, it is characteristic that a tremendous advantage can be provided in practical use.

Note that while the embodiment has been described as the locking portions 20 being provided downwardly of the end edge 6, the invention is such as to be similarly established in a case where the locking portions 20 are formed not only downwardly but also outwardly of the end edge 6 including sideward or upwardly of the end edge 6.

In addition, the numbers of the square holes 22 and the vertical wall portions 23 in the locking portion 20 can be selected appropriately according to the width of the clip 9 which is brought into engagement with the projection 28.

Furthermore, in case the invention is applied, in addition to the lamp housing of the headlamp, to other lamps on the vehicle such as a rear stop lamp and a combination lamp as done in the embodiment, an equivalent function and advantage to those provided in the embodiment can also be provided.

Furthermore, the invention can be applied to molding not only the lamp housings but also housings in general.

INDUSTRIAL APPLICABILITY

As has been described heretofore, the invention is useful as the method for molding the lamp housing for use for the headlamp and the structure for the lamp housing.

The invention claimed is:

1. A housing molding method comprising;
by using a first mold having a grating-like portion and a second mold adapted to alternately mesh with the grating-like portion of the first mold,
molding an end edge which extends outwardly of an opening in a housing such that a closing member for closing the opening is locked thereto; and
forming a projection which projects towards an opposite side to the opening on an outer side of the end edge by drawing out the grating-like portion of the first mold, which penetrates the end edge, towards the opening side which is opposite to an end portion of the grating-like portion and drawing out the second mold from the end edge position outwardly of the housing.

2. The housing molding method according to claim 1, wherein the first mold has a plurality of pillar-like portions which pass through the end edge and void portions formed between the pillar-like portions,
the grating-like portion is formed by providing the pillar-like portions and the void portions alternately, and
the second mold has a plurality of projecting portions which project into the void portions.

3. The housing molding method according to claim 2, wherein the projection is formed by a space surrounded by the pillar-like portions of the first mold and the projecting portions of the second mold.

4. The housing molding method according to claim 1, further comprising:
providing a third mold adapted to be assembled to the second mold on an opposite side to the opening; and
forming an extending member which extends outwardly of the housing by drawing the third mold to the opposite side to the opening.

5. The housing molding method according to claim 1, wherein the housing is a lamp housing, and the closing member is a lamp lens.

6. A structure for a housing in which a closing member is engaged by an engagement member, characterized by comprising:
an opening closed by the closing member;
an end edge extending from the opening to the closing member; and
a locking portion formed on the end edge;
wherein the locking portion is provided with a plurality of through holes which pass through the locking portion from a side thereof which face the opening to an opposite side thereof to the opening, a plurality of vertical walls which divide the adjacent through holes and a lateral wall connecting the vertical walls at one ends thereof,
the vertical walls are formed shorter than the lateral wall on the opposite side thereof to the opening, and
the lateral wall has notches formed therein on the opposite side to the opening and at locations which confront the vertical walls and projections formed thereon on the opposite side thereof to the opening and at locations which confront the through holes, respectively.

7. The structure for a housing according to claim 6, further comprising an extending member which extends outwardly of the housing on a side of the end edge which is opposite to the opening.

8. The structure for a housing according to claim 6, wherein the housing is a lamp housing, and the closing member is a lamp lens.

* * * * *